United States Patent [19]
Diehl

[11] Patent Number: 5,673,379
[45] Date of Patent: Sep. 30, 1997

[54] SCAN LINE GENERATOR FOR AREA FILL OF EXTENSIBLE POLYGONS

[75] Inventor: Michael R. Diehl, Fort Collins, Colo.

[73] Assignee: Hewlett-Packard Company, Palo Alto, Calif.

[21] Appl. No.: 407,467

[22] Filed: Mar. 20, 1995

[51] Int. Cl.$^6$ ............................................ G06T 11/00
[52] U.S. Cl. .................................................. 395/141
[58] Field of Search ............................ 395/141, 126, 395/127, 129, 131, 133, 135, 149, 150, 151, 155, 161, 167, 170, 326

[56] References Cited

U.S. PATENT DOCUMENTS 5,142,617  8/1992  Dacrymple et al. ............. 395/141

Primary Examiner—Almis R. Jankus
Attorney, Agent, or Firm—Edward L. Miller

[57] ABSTRACT

A scan line generator for area fill of a polygon defined by a left edge and a right edge includes a Bresenham-like mechanism in a left edge machine for selecting pixels to represent a left edge by determining, for each scan line, which pixel is either on the edge or immediately to the right thereof. A right edge machine contains an identical mechanism, which also does "to-the-right-of". Both edge machines operate in the first through fourth octants, and a coordination mechanism steps the two edge machines a scan line at a time, independent of the major and minor axis of each edge. When the pixel addresses for each edge's intersection with the next scan line are found their difference along the X axis is obtained to produce the length of a fill vector on that scan line. The intersection produced for the left edge is taken as the starting point of the fill vector. Left and right edges must initially start on the same scan line, but need not be of the same length in the Y axis. Polygons are extensible by appending additional left and right edges to form lists thereof as the fill operation proceeds. Scan line generation is suspended whenever the furthest extent in the Y axis is reached for either edge. The fill operation may be concluded gracefully when such a suspension occurs for both edges, regardless of whether or not it is for the same polygon vertex. The edge machines are equipped with programmable edge rule mechanisms that define whether to retain or discard a pixel that lies exactly on an edge of the polygon.

8 Claims, 9 Drawing Sheets

SCAN LINE GENERATOR FOR AREA FILL OF EXTENSIBLE POLYGONS

REFERENCE TO RELATED PATENT

This Patent is related to the subject matter disclosed in U.S. Pat. No. 5,025,405 entitled "METHOD OF INTERPOLATING PIXEL VALUES", which issued on 18 Jun. 1991 to Roger W. Swanson and which is assigned to Hewlett-Packard Co. For the sake of brevity in a portion of the disclosure herein, U.S. Pat. No. 5,025,405 is hereby expressly incorporated herein by reference.

MICROFICHE APPENDIX

This patent has been published with an unprinted thirty page Appendix A available as a single sheet of microfiche containing thirty frames.

BACKGROUND OF THE INVENTION

High performance graphics systems frequently incorporate dedicated hardware mechanisms in order to increase the speed at which the system can operate. Among the special purpose tasks that can be performed by such "graphics accelerators" is the identification of pixels that belong to the interior of a polygon to be rendered on a raster scan display device, such as a CRT. Once such pixel locations have been identified other hardware can compute, among other things, their colors, intensities and depths. The subject matter of this Patent pertains to hardware that identifies by pixel address within the raster those pixels that are interior to a polygon, given a polygon description that includes an ordered list of left edge vertices and an ordered list of right edge vertices.

Such an activity involves using consecutive vertices in the ordered lists as end points of a line that is a segment of the polygon edge. Left edge vertices produce left edge segments, and right edge vertices produce right edge segments. By inspection of the vertices the various scan lines that intersect both edge segments can be determined. The pixels of interest are those that are on such scan lines and that are also on or between the edge segments. However, recently developed standards, such as X-Windows (X11) involve definitions for the interior of a polygon that prevent adjoining polygons from each producing the same pixel; i.e., a pixel can only belong to one such polygon (as long as the polygons merely touch, and do not overlap).

As a consequence, one of the more widely employed techniques for determining which pixels define the line segment between two vertices (Bresenham's Line Algorithm) is inappropriate, since it selects, based on an ideal location that is generally between actual pixel locations, either the pixel to the immediate left or to the immediate right, depending upon which of those is closer to the ideal location. However, the edge rules for X-Windows use a "to-the-right-of" criterion in place of a mere "closest" criterion. This loss of Bresenham's algorithm is unfortunate, as the Bresenham algorithm has many advantages that make it attractive for implementation in hardware. It would be desirable if a Bresenham-like algorithm could be developed for an edge machine that would be compatible with X11 and yet still retain the customary advantages associated with Bresenham. It would further be desirable if a polygon fill machine were constructed from such edge machines, and if, once started, additional edges could be appended to extend the polygon.

SUMMARY OF THE INVENTION

An X-Windows compatible scan line generator for area fill of a polygon defined by a left edge and a right edge includes a Bresenham-like mechanism in a left edge machine for selecting pixels to represent a left edge. It does this by determining, for each scan line, a pixel that is either on the edge or immediately to the right thereof. A right edge machine contains an identical mechanism, which also does "to-the-right-of". Both edge machines operate in the first through fourth octants, and a coordination mechanism steps the two edge machines a scan line at a time, independent of the major and minor axis of each edge. When the pixel addresses for each edge's intersection with a scan line are found their difference along the X axis is obtained to produce the length of a fill vector on that scan line. The intersection produced for the left edge is taken as the starting point of the fill vector. Left and right edges must initially start on the same scan line, but need not be of the same length in the Y axis. Polygons are extensible by appending additional left and right edges to form lists thereof as the fill operation proceeds. Scan line generation is suspended whenever the furthest extent in the Y axis is reached for either edge. The fill operation may be concluded gracefully when such a suspension occurs for both edges, regardless of whether or not it is for the same polygon vertex. The edge machines are equipped with programmable edge rules that define what to do under the various circumstances where a pixel location is found to lie exactly on a polygon edge.

DESCRIPTION OF A PREFERRED EMBODIMENT

Figure 1:
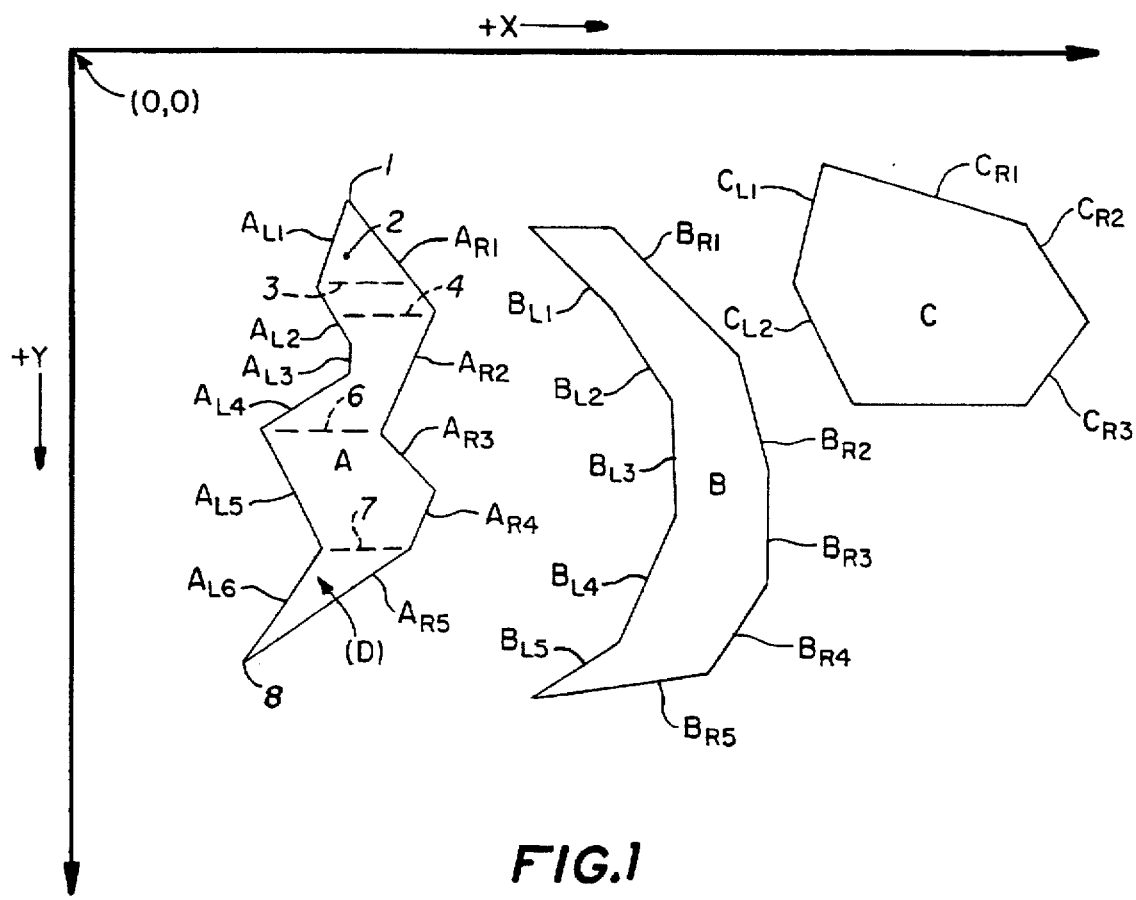
FIG. 1 depicts examples of various extensible polygons described by ordered lists of left edges and right edges and whose interior pixel locations can be identified by the polygon fill machine of FIG. 7.

In all of the examples and explanations that follow, we will observe the usual conventions for direction that are associated with raster-scan pixel-oriented CRT's. That is, for pixel addressing the upper left corner is location (0,0), so that the direction of increasing X addresses is to the right and the direction of increasing Y addresses is down. The edges of polygons will be lines defined by their associated endpoints ($X_{start}$, $Y_{start}$) and ($X_{end}$, $Y_{end}$). Prior processing by a separate mechanism will decide what sequence of left and right edges describe a polygon, or extended polygon, of interest. By the term "extended polygon" we mean a geometrical shape described by ordered lists of left and right edges. An edge can be described either by its two end points or by its starting point and the associated $\Delta x$ and $\Delta y$, where $\Delta x = X_{end} - X_{start}$ and $\Delta y = Y_{end} - Y_{start}$. Prior processing will also ensure that no $\Delta x$ or $\Delta y$ exceeds respective practical limits, and that $\Delta y$'s are greater than or equal to zero. The sign of a $\Delta x$ is unrestricted, and a $\Delta x$ may have a value of zero. An edge cannot be both left and right. Any edge that crosses another must have been previously partitioned into pieces and a re-labelling performed to preserve the relationships of to-the-left-of and to-the-right-of. However, two edges may have a either a common starting point and/or a common end point. Processing of an extended polygon may begin as soon as at least the first left edge and first right edge are determined. Additional edges may be specified as they become known, and the process for determining which pixel locations are interior to the extended polygon will gracefully suspend and then resume its operation as old edges are used up and new ones are specified.

Even though the pixel grid as described above has at its upper left-hand corner an absolute origin of (0, 0) for pixel addressing, it is frequently convenient to consider an individual line segment as a vector originating at a "local origin", as it were, of ($X_{start}$, $Y_{start}$). Thus, given that the local origin of the vector is known, the vector can be described by its associated $\Delta x$ and $\Delta y$. Furthermore, it is convenient to associate an octant with each such polygon edge, or vector. An octant is similar to the usual quadrants I–IV of analytic geometry, but with the following differences. First, a quadrant is 90° while an octant is half that, or 45°. Next, the first quadrant I is the first 90° counterclockwise from the abscissa, while in our case the "first" octant is named "zero" and occupies the first 45° clockwise from the abscissa (X axis). We shall denote the various octants thus: $O_0$, $O_1$, $O_2$, $O_3$, . . . . We prefer this as it is compact, matches the bits that go into registers that identify octants by number (binary does not start at one, after all), distinguishes from the quadrants I–IV of analytic geometry, and keeps us from having to write the word "octant" so many times. Finally, our use of the octant idea is heeded to identify the direction in which a vector points, and octant determination is thus performed relative to the local origin of the vector: ($X_{start}$, $Y_{start}$). Given that $\Delta y \geq 0$, we expect to never encounter vectors that lie in the octants $O_4$, $O_5$, $O_6$ and $O_7$. Thus, the first quadrant I is a fixed and unmoving permanent segment of the Cartesian plane, such that a given vector or line segment is either inside (whether all or partially) or is not inside the first quadrant I, independent of the slope of that line or vector. That is, each Cartesian quadrant is a place that something can be within. In contrast, the octant $O_2$ describes a range of slopes, and cannot be thought of as a place describing a fixed 1/8 of the plane (since where it is depends on the local origin of the vector). So it would be a non sequitur to say that a certain vector lies in(side) $O_2$ and has a slope of 125/1000.

The following Table 1 defines the various octants by angular position around a central origin. The direction of increasing angular position is clockwise, from a horizontal line starting at the origin and moving pointing to the right.

TABLE 1

| OCTANT | ANGULAR RANGE |
|---|---|
| $O_0$ | 0° $\leq \theta <$ 45° |
| $O_1$ | 45° $\leq \theta \leq$ 90° |
| $O_2$ | 90° $< \theta \leq$ 135° |
| $O_3$ | 135° $< \theta \leq$ 180° |

Associated with the idea of octants describing vectors is the notion of major and minor axes. To appreciate these notions it is necessary to recognize that vectors are rendered into actual collections of pixels that are not always true functions in the strict mathematical sense, even though the corresponding vector of analytic geometry would be a function. It is the quantizing of a continuous thing into discrete pixels that is responsible for this. Consider a line whose slope m is $0 \leq m \leq 1$. In this case it is possible to step along the line in increasing values of the X axis, and for each such x find just one y, such that (x, y) represents the next pixel for that line. We say that we step along the major axis to find associated single positions along the minor axis. The fundamental means commonly in use to perform such finding do not cope with the case m>1, since a plurality of y values would often need to be found for each next x. (It is not that the line can't be represented that way. Indeed, it will be just that way once pixels are stored in the frame buffer. The problem is in the finding.) It is a great deal easier to simply find one y for each next x. Accordingly, graphics processing techniques are generally prepared, on a vector-by-vector basis, to interchange the roles of the axes as needed. Thus, for a vector whose slope m is, say, five, the Y axis would be taken as the major axis and the X axis would be the minor axis. We would then step regularly along the Y axis to find the associated locations in y that are accompanied by a change of one pixel location in the X axis. We might go several steps in y before incrementing in x, which corresponds to the awkward case of incrementing X once and having to associate that x with a plurality of consecutive values for y.

Such considerations (interchanging x and y relative to the roles of major and minor axes) do not require us to describe the vector any differently, but they do require us to accomplish some sort of axis interchange in the pixel finding mechanism that renders the vector into pixels. The fundamental internal operation of the pixel finding mechanism remains quite similar in both cases, although we now have the burden of keeping track of which axis is the major axis and which axis is the minor axis. In either case there is produced a collection or sequence of (X, Y) pixel addresses that are used to access the frame buffer. The order in which these are produced and subsequently stored in the frame buffer is of no particular concern; the ultimate displayed result is the same for a given frame buffer content, regardless of the exact order in which that content got stored therein.

Hence, we can produce, once and for all, a Table 2 below that relates the octant of any vector to the associated major and minor axes.

TABLE 2

| OCTANT | MAJOR AXIS | MINOR AXIS |
|---|---|---|
| $O_0$ | X($\Delta x > 0$) | Y($\Delta y > 0$) |
| $O_1$ | Y($\Delta y > 0$) | X($\Delta x > 0$) |

TABLE 2-continued

| OCTANT | MAJOR AXIS | MINOR AXIS |
| --- | --- | --- |
| $O_2$ | $Y(\Delta y > 0)$ | $X(\Delta x < 0)$ |
| $O_3$ | $X(\Delta x < 0)$ | $Y(\Delta y > 0)$ |

Note that in $O_2$ and $O_3$ $\Delta x<0$. This reflects the idea that, in those octants steps in Y are accompanied by decrements in X. Note also that $\Delta y$ is never negative.

With all of the foregoing good stuff in mind, consider now the collection of extended polygons A, B and C depicted in FIG. 1. Polygon A is defined by six left edges $A_{L1}$–$A_{L6}$ in conjunction with five right edges $A_{R1}$–$A_{R5}$. Polygons B and C are defined by similar respective lists of left and right edges.

Consider polygon A. The determination of its edges and interior pixel locations may commence as soon as $A_{L1}$ and $A_{R1}$ are provided. In the present example $A_{L1}$ and $A_{R1}$ share a common starting point 1. This need not be the case, as is shown in connection with polygon B. However, in all cases the y value of the starting point for the first left edge must equal the y value of the starting point for the first right edge. That is, the present embodiment refuses to infer the existence of an implied edge. (It is not so much that such an inference would be technically distant, as it muddies the division of labor between the rendering process and the polygon specification process. In so doing it could potentially create confusion between who did or did not do what, and could thus contribute to a bug prone and less reliable system.)

To continue, once $A_{L1}$ and $A_{R1}$ have been specified the process of finding the pixels for those edges, and any pixels intervening therebetween, commences. The polygon fill operation will progress down to dotted line 3, thus identifying and specifying the locations of pixels that lie in interior region 2. Assuming that $A_{L2}$ has not yet been provided, the fill operation will suspend itself until it is. Once $A_{L2}$ is available the fill operation will resume, but would again stop at dotted line 4 unless $A_{R2}$ has already been specified. For the polygon A as drawn, completion is not a practical possibility before the dotted line 6 is reached, for it is not until then that a left and right edge each have an ending point with the same y value. If either of $A_{L5}$ or $A_{R3}$ is actually specified, however, operation must continue down to at least dotted line 7. In the example as shown the fill operation continues down to the final common ending point 8.

It will be understood, of course, that polygon A might have been broken into two polygons; say, the one A above dotted line 7 and the small remaining triangle (say, D) below. In such as case $A_{L6}$ would now be $D_{L1}$ and $A_{R5}$ would now be $D_{R1}$. Polygon D would now be handled as a separate operation, but as far as the selection of edge pixels and interior pixels is concerned, the overall end results will be the same.

Generally similar remarks apply to polygon B, which we need not separately discuss, other to point out that the starting points for $B_{L1}$ and $B_{R1}$ have unequal x values. That produces an implied top edge, which is permissible (only implied left or right edges are disallowed). Polygon C is similar to polygon A and is used in enlarged form in FIG. 3 as an example for additional remarks concerning the edge rules for selecting pixels and the mechanism for determining which pixels are inside the polygon.

Figure 3:
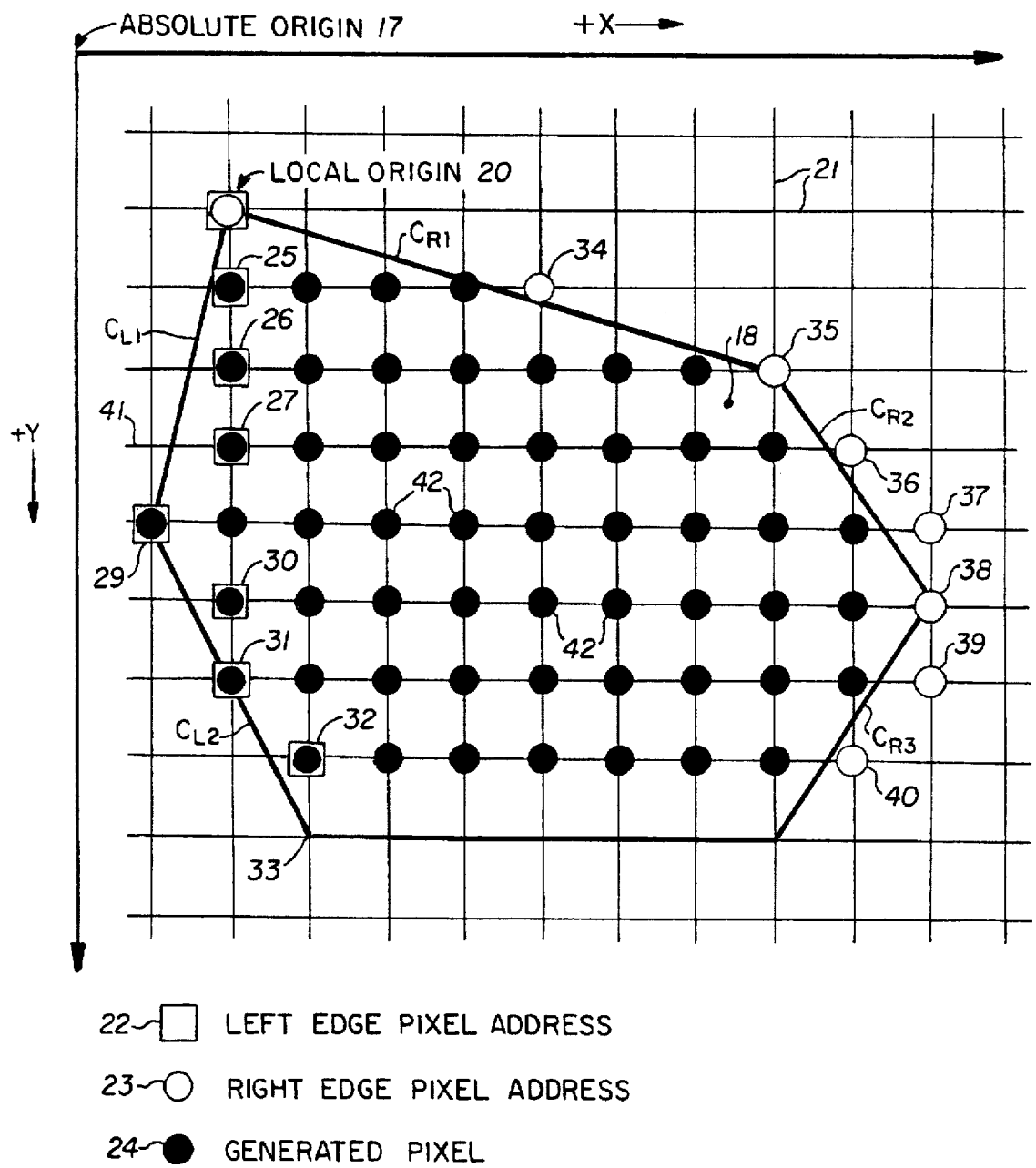
FIG. 3 is a particular example of a polygon fill operation based on one of the extensible polygons depicted in FIG. 1, and illustrating various edge rules associated with certain industry standards, such as X-Windows.

However, before proceeding to the example of FIG. 3 we should introduce the edge rules and describe a strategy for implementing them. The polygon edge rules may be stated thus:

A pixel is included in (selected for) a polygon if the center point of the pixel is inside the polygon and the center point is not on the boundary. If the center point is on the boundary, the pixel is included if and only if the polygon interior is immediately to the right. Pixels with centers along a horizontal edge are included if and only if the polygon interior is immediately below. If a given pixel is apparently both included and excluded, then exclusion prevails.

The edge rules arise from the X-Windows standard, and are intended to allow exactly adjoining polygons to be described as having common vertices while preventing any pixels from being included in more than one polygon.

The edge rules cause a departure from the notion of using the Bresenham line algorithm to select pixels that represent an edge of a polygon while using the ideal line connecting the vertices at the ends of that edge. This is because Bresenham's algorithm selects the closest pixel to the ideal line, without regard for the "immediately to the right" criterion; that criterion can produce situations where it is a "farthest" pixel that ought to be selected. Nevertheless, the mechanics of Bresenham's algorithm are attractive for high-speed hardware implementations, since floating point numbers and division are avoided. How to salvage Bresenham while retaining the edge rules?

Figure 2:
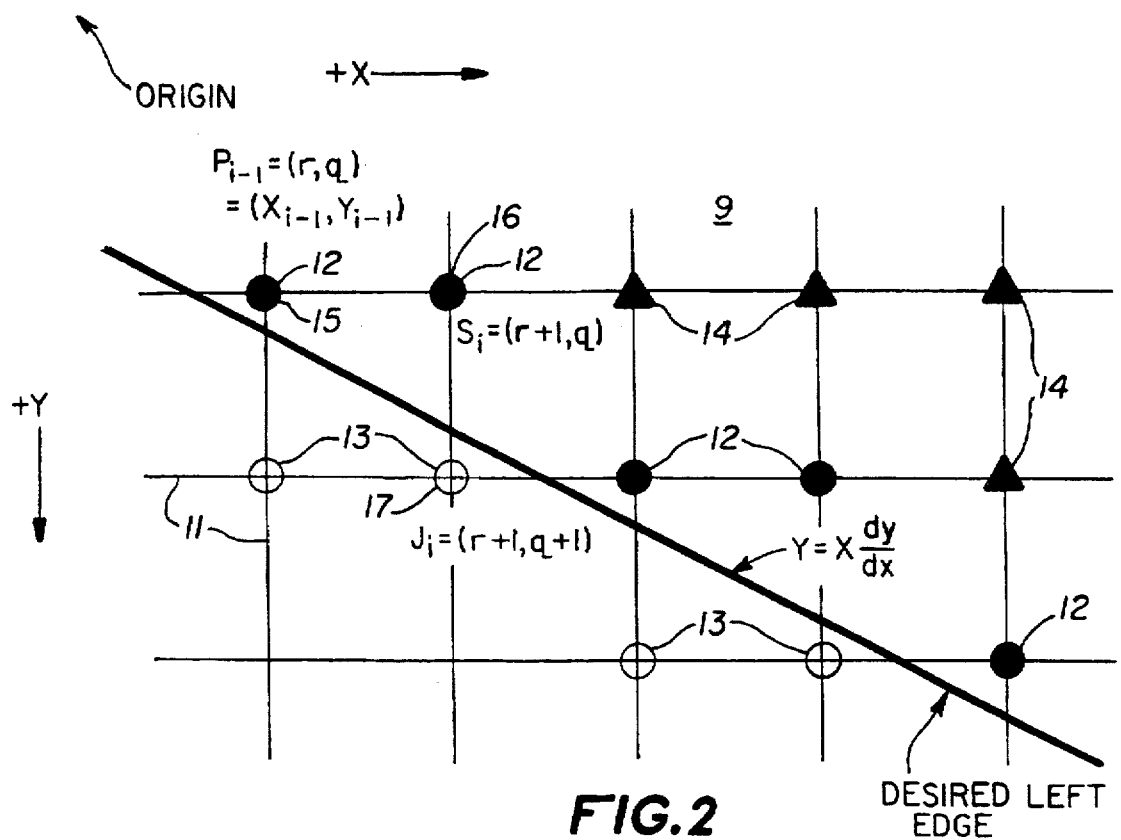
FIG. 2 is a pixel grid diagram useful in defining certain relationships in analytic geometry that are employed in developing a modification to Bresenham's line drawing algorithm that is incorporated in the material of FIGS. 3, 4, and 7.

Refer now to FIG. 2, which is a starting point for developing an edge pixel selection algorithm after the style of Bresenham, but which is consistent with the X-Windows edge rules stated above. FIG. 2 is a graph 9 of an ideal line for a $O_0$ left edge of a polygon (not shown). The line 10 is shown against a pixel grid 11, whereon the solid circles 12 represent pixel locations selected to represent the left edge, hollow circles 13 represent pixel locations involved in the deliberations, but that are not selected, and the solid triangles 14 represent pixel locations that are selected because they are wholly inside the polygon.

The development uses the notions of STEP's and JUMP's. A STEP is a one pixel motion along the major axis without an accompanying increase in the position along the minor axis. A JUMP is where both increase by one location. Note that the motion caused by a particular STEP or JUMP is dependent upon which of X or Y is the major axis. And, interchanging the roles of the major and minor axes does not cause a simple switch where a JUMP becomes a STEP, and vice versa; a STEP when Y is the major axis has no corresponding motion when X is the major axis.

Consider the $(i-1)_{th}$ pixel 15 $P_{i-1}$ whose location is $(r, q)$. A STEP leads to pixel location 16 $S_i=(r+1, q)$, while a JUMP leads to location 17 $J_i=(r+1, q+1)$. Note that the equation of the line 10 is given by $y=x(dy/dx)$. The development starts by considering what to do next after having selected pixel 15 $P_{i-1}=(r, q)$.

The following development may be appreciated with reference to FIG. 2:

(1) If $q+1>(dy/dx)(r+1)$ then choose $STEP_i$; if $q+1<(dy/dx)(r+1)$ then choose $JUMP_i$. (The case where $q+1=0$ requires choosing STEP or JUMP according to additional criteria, and is described later.)

(2) $dx(q+1)>dy(r+1)$ (3) $dx(q+1)-dy(r+1)>0$ Multiply by $-1$ and rearrange.

(4) $dy(r+1)-dx(q+1)<0$ Let d be the difference between the actual line value and a JUMP. Substitute for r and q. Thus we can now say:

(5) If $d_i=dy(x_{i-1}+1)-dx(y_{i-1}+1)<0$ then choose $STEP_i$; if $d_i=dy(x_{i-1}+1)-dx(y_{i-1}+1)>0$ then choose $JUMP_i$. Now add one to all the subscripts.

(6) $d_{i+1}=dy(x_i+1)-dx(y_i+1)<0$ Subtract (5) from (6) and re-arrange to isolate $d_{i+1}$.

(7) $d_{i+1}-d_i=dy(x_{i-1}+1)-dy(x_{i-1}+1)-dx(y_i+1)+dx(y_{i-1}+1)$
(8) $=dyx_i+dy-dyx_{i-1}-dy-dxy_i-dx+dxy_{i-1}+dx$ Collecting terms and factoring, we get:
(9) $=dy(x_i-x_{i-1})-dx(y_i-y_{i-1})$ Now, $x_i-x_{i-1}=1$. Substituting and solving for $d_{i+1}$ gives:
(10) $d_{i+1}=d_i+dy-dx(y_i-y_{i-1})$ Thus, we can now test $d_i$ to find $d_{i+1}$. If $d_i<0$ then choose STEP$_i$, which is to say, $y_i=y_{i-1}$, and hence:
(11) $d_{i+1}=d_i+dy$ If $d_i>0$ and we choose JUMP$_i$, which is to say, $y_i=y_{i-1}+1$, and hence:
(12) $d_{i+1}=d_i+dy-dx$ To find the initial value of $d_i$ for $i=1$, let $i=1$ and substitute $(0, 0)$ for $(x_0, y_0)$ in (5):
(13) $d_1=dy(x_{i-1}+1)-dx(y_{i-1}+1)$
(14) $d_1=dy(x_0+1)-dx(y_0+1)$
(15) $d_1=dy(0+1)-dx(0+1)$, and hence:
(16) $d_1=dy-dx$ Equations (11) and (12) represent actions taken in correspondence to the conditions of $d_i<0$ and $d_i>0$, respectively. In an application where there were no edge rules we would expect exactly one of these conditions to additionally include the condition of equality (the corresponding inclusion of equality would propagate backwards through the preceding equations, too). As will become clear when the hardware implementation of the above algorithm is explained in a four octant environment ($O_0$ through $O_3$), the equality condition requires additional treatment. Basically, the decision of whether to do a STEP or a JUMP in such cases will depend on which octant contains the polygon edge of interest. We shall disclose a way to make a correct decision in the case of equality that does not slow the execution of the algorithm in the least.

We now have an iterative way after the style of Bresenham to select pixels that are to the right of the ideal line that is associated with the left edge of a polygon. We are now in a position to proceed with a more detailed example based on polygon C in FIG. 1.

FIG. 3 depicts a polygon 18 of the same shape as polygon C of FIG. 1. Polygon 18 has been moved closer to the absolute origin 19 so that both may be shown in the same figure. This is of no particular concern, since exactly what the values are for the local origins (e.g. 20 of $C_{L1}$ or $C_{R1}$) is of no interest throughout most of the inner workings of the process we are about to describe. Polygon 18 is shown against a pixel grid 21, wherein hollow squares 22 denote left edge pixel addresses, hollow circles 23 denote right edge pixel addresses and solid circles denote generated pixels.

Among the things of interest for polygon 18 are these: Consider left edges $C_{L1}$ and $C_{L2}$. Pixels 25, 26 and 27 are selected to represent $C_{l1}$; pixel 20 (which is also the local origin of $C_{L1}$) is not included. This is because it is also part of the right edge $C_{R1}$, and is thus excluded under the edge selection rules stated above. Pixel 29 is not part of $C_{L1}$, just as location 33 is not generated as part of $C_{L2}$. At the time $C_{L1}$ is being dealt with the existence of $C_{L2}$ is not relied upon. Pixel location 29 is an end point for $C_{L1}$, and if there were no $C_{L2}$ then no pixel at location 29 should be generated, as there would then be no part of the polygon immediately below. Note the pixel 29 is generated as part of $C_{L2}$, however, so that pixel 29 is neither omitted nor generated twice. It is for the same general reason that pixel location 33 has no generated pixel, and that the entire scan line has no generated pixels. If they were needed they would be generated by an adjoining polygon as part of its fill process. Thus worketh the edge rules for X-Windows.

Note that the to-the-right-of criterion does violence to the usual Bresenham idea of selecting the pixel closest to the ideal location. Observe, for example, how pixel 27 is selected in favor over one at location 41.

Now consider the right edges $C_{R1}$, $C_{R2}$ and $C_{R3}$, and their associated pixel locations 28 and 34 through 40. None of those pixels are ultimately selected to be part of the polygon 18; it is generally the pixel location immediately to the left that we are interested in. Yet we are better off if we stick to the same to-the-right-of pixel identifier used for the left edge (and finding pixels 28 and 34-40), rather than building a corresponding to-the-left-of pixel identifier. That is because we can subsequently subtract the left x value from the right x value for each scan line to find the number of consecutive pixel locations to select, starting at the location on the left. (That is actually how all of the various solid circles 42 in polygon 18 are found and also specified to an interested mechanism, such as a frame buffer controller.) Now we have two instances of the same mechanism, which is inherently simpler, and we also have a simple solution to cases like pixel 28 (whether at the top as in polygon C, or at the bottom as for vertex 8 of polygon A in FIG. 1). That is, a length of zero is produced whenever a pixel location is common to both a left and right edge. Having a length of zero is an easy thing to detect, and is easily used to cause the starting pixel to be suppressed or ignored. Such is the actual operational reason that pixel 28 is not selected. This is simpler than checking every pixel along an edge to see if it is excluded.

Pixel location 33 is not selected as part of $C_{L2}$ (nor was location 29 as part of $C_{L1}$) because that location is associated with a $Y_{end}$. The edge pixel selection mechanism finds the difference $Y_{end}-Y_{start}$, puts that difference into a decrementable register, and then does that many findings beginning with $Y_{start}$. (After each finding the register is decremented, and findings cease when the register gets to zero.) Thus, the edge pixel selection mechanism never even considers the last scan line containing $Y_{end}$.

We can now begin to see the light at the end of the tunnel. What we need is two instances of a machine that will do the Bresenham style to-the-right-of determination that was developed in connection with FIG. 2. One will be for left edges and one for right edges. Each will need to accommodate an edge being in any of $O_0$ through $O_3$. A mechanism is needed to associate the next point along the current left edge with the next point along the current right edge. This is not entirely trivial, since if one edge machine is treating X as a minor axis and the other is treating X as the major axis, the X-as-minor-axis edge machine may very well have to run for several clock cycles beyond the single cycle that is required to select the next pixel location with the X-as-major-axis edge machine. Or, two minor axis machines might have to run for different numbers of cycles. A related concern is what to do if one edge machine gets to its $Y_{end}$, but the other edge machine is working on an edge having a more distant $Y_{end}$.

In the preferred embodiment to be described below the edge machine that finishes the $i_{th}$ scan line first will wait at the $(i+1)_{th}$ scan line until both are ready to start that (i.e., the next) scan line. Then $X_{Ri}-X_{Li}$ is found and put with ($X_{Li}$, $Y_{Li}$) and the resulting triple sent to the frame buffer controller, or whatever is the next mechanism in the graphics data path. As described above, an edge machine does not deal with a scan line containing $Y_{end}$. If an edge extends in Y beyond the other edge, the edge machine for the extending edge waits for the other edge machine to be given a next edge before proceeding. There is also a set-up machine that finds the initial difference ($d_i$) terms, edge machine constants, and the various $\Delta x$'s and $\Delta y$'s. In a preferred embodiment this coordination of overhead and control issues between the edge machines and for the set-up machine is performed by a suitable state machine.

Figure 4:
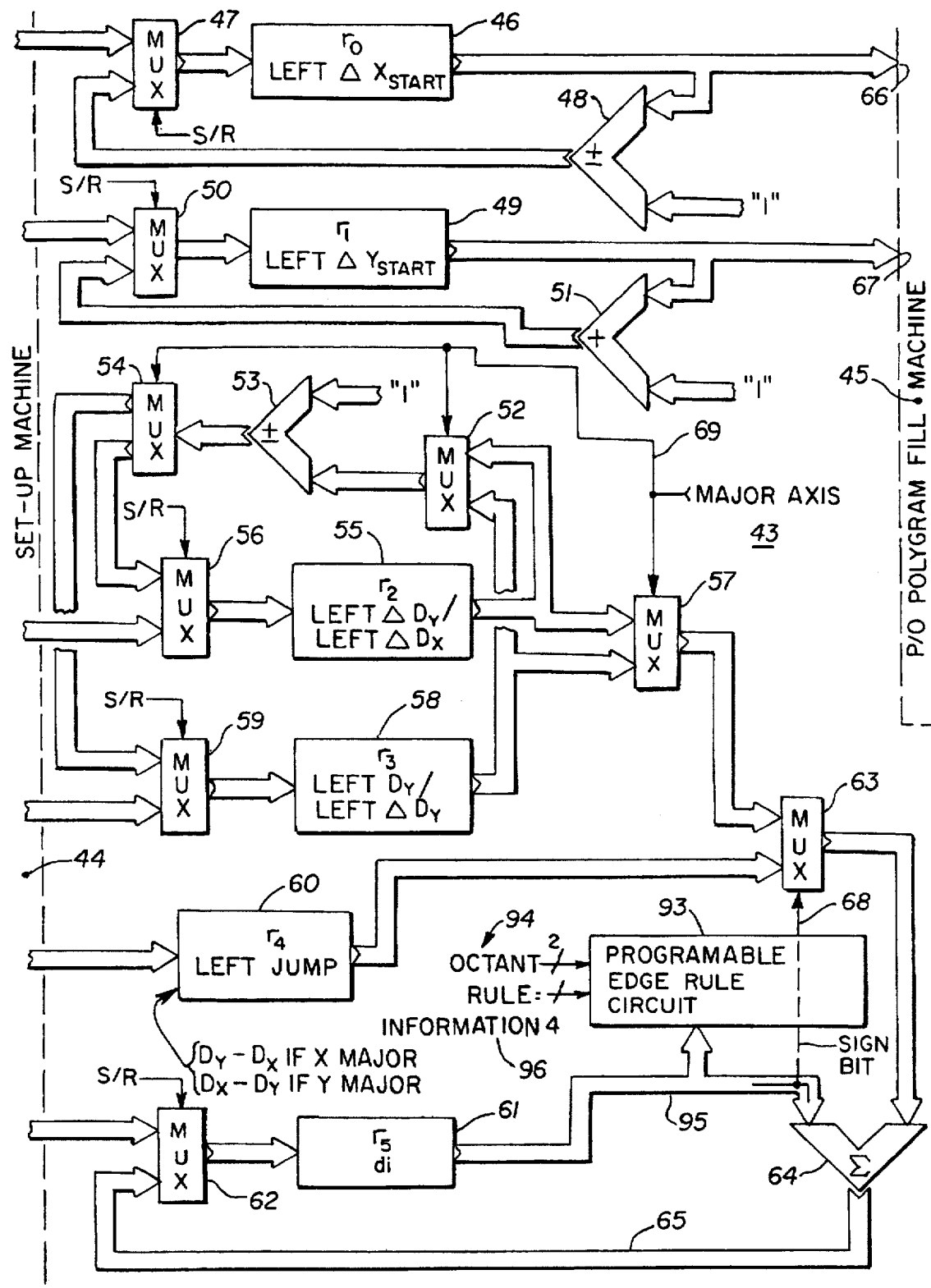
FIG. 4 is a simplified block diagram of an edge machine that identifies the left edge of an extensible polygon in accordance with a modified Bresenham algorithm.

Refer now to FIG. 4, wherein is shown a simplified block diagram describing the logical equivalent of a left edge machine 43. Left edge machine 43 receives its input from an environment 44 that we shall call the set-up machine (not shown). The job of the set-up machine is to accept the end points of a left edge, determine if that edge will be stepped in X as the major or as the minor axis, calculate certain constants and get them loaded into associated registers in the edge machine. For the purposes of our explanation, we shall assume initially that X is the major axis.

At the start of operating on an edge, the following six registers are loaded as now described. Register $r_0$ 46 gets a value we shall call Left $\Delta$ $X_{start}$. At the time the set-up machine does this the value of Left $\Delta$ $X_{start}$ is the same as what we have been calling $X_{start}$ for the left edge. (We denote the name for $r_0$ with a "$\Delta$" because after each scan line is completed its value will be adjusted, if needed, to describe the vertices of the overall polygon fill task that remains, as if the scan line just completed were part of a previous task instead of part of an ongoing task in progress.) In an altogether analogous fashion register $r_1$ 49 is loaded with a value Left $\Delta$ $Y_{start}$ that initially has the same value as $Y_{start}$ for the left edge. Register $r_2$ 55 is loaded with a value that we shall call Left $\Delta$Dy, which starts out equal in value to Left Dy=(Left $Y_{end}$)−(Left $Y_{start}$). (The "$\Delta$" in the name is for the same reason as above; the value stored therein may change after each scan line.) Register $r_3$ 58 gets the value Left Dy. The value in Left Dy stays unaltered during of the traversal of the left edge. Register $r_4$ is loaded with the constant of adjustment for a jump, which we shall call Left Jump; Left Jump=(Left Dy)−(Left Dx). Finally, register $r_5$ 61 is loaded with the initial value for the iterative error term $d_i$.

During the set-up phase the initial loading of registers $r_0$ through $r_3$ and of $r_5$ is facilitated by MUX's 47, 50, 56, 59 and 62, respectively. During the set-up phase these MUX's will be set to allow the contents of their associated registers to be obtained from the set-up machine. Afterwards, the values in these registers will either remain unchanged or will be altered according to events within the left edge machine 43. During the operation of stepping along the left edge, then, those MUX's will each be set oppositely to what they were during set-up.

The left edge machine 43 produces output data that is used in the external environment 45, which is part of a polygon fill machine, or scan line generator, that has both left and right edge machines. (The polygon fill machine is not shown in FIG. 4, and will be described in connection with FIG. 5). The output data from the left edge machine 43 is a series of value pairs 66 and 67 that are the successive contents of registers $r_0$ and $r_1$; i.e., a succession of Cartesian coordinates (Left $\Delta$ $X_{start}$, Left $\Delta$ $Y_{start}$). As will shortly become clear, this sequence of coordinates is a traversal along the left edge.

Here is how the left edge machine 43 works, and what the values in the various registers mean. We shall begin with that portion that implements the actual Bresenham-like pixel finding for the left edge, as developed in conjunction with FIG. 2. That is, with the hardware elements that perform the operations of Eq's (11) and (12) above. Register $r_5$ 61 holds the value of $d_i$, which is then added by summer 64 to either register $r_3$ 58 (Dy) or $r_4$ 60 (Dy−Dx), depending upon which is selected by MUX 63 according to the signal 68. Signal 68 is nominally the sign of $d_i$, except when the content of register $r_5$ 61 equals zero, in which case the value of signal 68 is determined by a programmable edge rule circuit 93 in accordance with what octant the edge is in. (The programmable edge rule circuit 93 is separately described in connection with FIG. 5.) During iterative operation (i.e., after the set-up phase) MUX 62 will be set to couple the output of the summer 64 back into register $r_5$, so that $d_i$ is indeed adjusted. Register $r_3$ 58 is made available to MUX 63 through MUX 57. MUX 57 is controlled by a signal 69 that corresponds to which of the axes is the major axes. When the X axis is the major axis then MUX 57 selects the contents of register $r_3$ 58 and not those of register $r_2$ 55.

For each step in the (x) major axis a new value of $d_i$ is loaded into register $r_5$; the value in register $r_2$ 55 (Left $\Delta$Dy) may or not be decremented by one, depending on the slope of the left edge. Eventually, however, the starting point on the scan line below the one in hand will be identified, and Left $\Delta$Dy will need to be decremented. This is accomplished by MUX's 52 and 54 operating in conjunction with an adder 53 that either adds or subtracts one. The MUX's 52 and 54 select $r_2$ for this operation (as opposed to $r_3$, which is the other choice possible according to the way the hardware is arranged) because the value of the signal 69 indicates that X is the major axis. The reason Left $\Delta$Dy ($r_2$) is decremented is to count down to the end of the left edge; when it's value reaches zero the edge has been traversed. Recall that Left $\Delta$Dy starts out equal to Left Dy, which is Left $Y_{end}$−Left $Y_{start}$. (In the larger environment of the scan line generator as a whole, there are two edge machines, and the one which finds its new $\Delta$Dy first will need to hold up and wait for the other machine to catch up before they proceed to work on the next scan line.)

Each time a new value of $d_i$ is loaded into register $r_5$ the value in register $r_0$ 46 (Left $\Delta X_{start}$) is adjusted and made available as an output data value 66. Each time Left $\Delta$Dy is incremented we also need to increment register $r_1$ (Left $\Delta Y_{start}$). In this connection, $r_0$ is either incremented or decremented by adder 48 and the sum applied through MUX 47 back into $r_0$. The reason that $r_0$ can either be incremented or decremented is because the left edge can be either in $O_0$ or $O_1$ (increment $r_0$) or in $O_2$ or $O_3$ (decrement $r_0$). That is, x is allowed to step in either direction, left or right. No such freedom attaches to y, however; it is allowed only to increment. Edges are not allowed to be in $O_4$–$O_7$. Therefore, register $r_1$ 49 (left $\Delta Y_{start}$) is only ever incremented, using an adder 51 that adds by one and a MUX 50 to get the incremented value back into $r_1$.

Now return for a moment to registers $r_2$ and $r_3$ and their associated MUX's and adder 53. What goes into these registers changes if Y is the major axis. If Y is the major axis then register $r_2$ 55 contains Left Dx and register $r_3$ 58 contains Left $\Delta$Dy. These different values are provided by the set-up process. During the iteration of $d_i$ MUX 57 is set to connect to register $r_2$ 55 (Left Dx), and MUX's 52 and 54 arrange that it is now register $r_3$ 58 (Left $\Delta$Dy) that counts to zero. (The symmetry implied by switching the roles of X and Y when Y is the major axis does not extend to forming a Left $\Delta$Dx and then counting it down to zero. After all, the scan lines remain where they were, and are still steps in the Y direction. So, Left $\Delta$Dy still needs to count down to zero, just as before, and there is no corresponding Left $\Delta$Dx.) However, even though Y is now the major axis, he left edge can still belong to any of $O_0$–$O_3$, and Left $\Delta X_{start}$ in register $r_0$ 46 will need to be either incremented or decremented, as appropriate. A further difference is that each iteration for $d_i$ produces a step in Y, even though there may or may not have been a change in X. Thus, each iteration requires that a new pair of up-to-date output values 66 and 67 be presented to the outside. Except for these differences, the internal operation of the left edge machine when Y is the major axis is quite similar to when X is the major axis. Later on, it will be clear that the left and right edge machines need to cooperate as each does its edge, but this is largely a matter of one machine waiting for the other.

Table 3 below summarizes the meanings of the contents of registers $r_0$–$r_5$ under the two different cases for major axis.

TABLE 3

| REGISTER | USE WHEN X MAJOR | USE WHEN Y MAJOR |
|---|---|---|
| $r_0$ | Left $\Delta X_{start}$ | Left $\Delta X_{start}$ |
| $r_1$ | Left $\Delta Y_{start}$ | Left $\Delta Y_{start}$ |
| $r_2$ | Left $\Delta Dy$ | Left Dx |
| $r_3$ | Left Dy | Left $\Delta Dy$ |
| $r_4$ | Left Jump = Dy − Dx | Left Jump = Dx − Dy |
| $r_5$ | $d_i$ | $d_i$ |

Finally, we should say that with regard to FIG. 4, the block diagram shown there is a simplified functional equivalent of the relationships between the contents of the various registers. In the first case, most of the control information has been omitted for brevity. It is easy to appreciate that the sign information 68 from $r_5$ sets the state of MUX 63, but the comparable origins for most of the other control signals are tedious. Next, the MUX's themselves are, in a preferred embodiment, not there as separate and discrete functional elements. Instead, the registers $r_0$–$r_5$ exist in a bus environment. Each register, as well as the various other resources such as the adders, are connected to one or more busses. Set and Dump instructions are implemented for the needed combinations, such as "Dump $r_n$ to Bus$_1$" and Set $r_m$ from Bus$_2$". MUX's are simply not necessary in such an environment, where things can be sent from one specified place to another via an interconnecting bus. So, the REAL block diagram is simply a collection of resources interconnected by various busses, with some kind of control mechanism that tests conditions and issues instructions. The control mechanism is preferably a state machine, or its equivalent. A block diagram reflecting the bus architecture, while truthful, is of relatively limited use, as it does not indicate the kinds of data flow that are produced by the sequence of instructions. It is because of a desire to convey functional information that FIG. 4 has been presented as it has. For those who crave more detail about the actual implementation, Appendix A gives cede for a state machine simulator that also served as the basis for the input text to a state machine generator for the creation of an actual state machine that controls the bus architecture version of the block diagram of FIG. 4. Lastly, the incorporated Patent to Swanson (U.S. Pat. No. 5,025,405) contains a fairly detailed example of how a Bresenham pixel value engine can be implemented with registers and adders in a bus environment that is controlled by a state machine.

Figure 5:
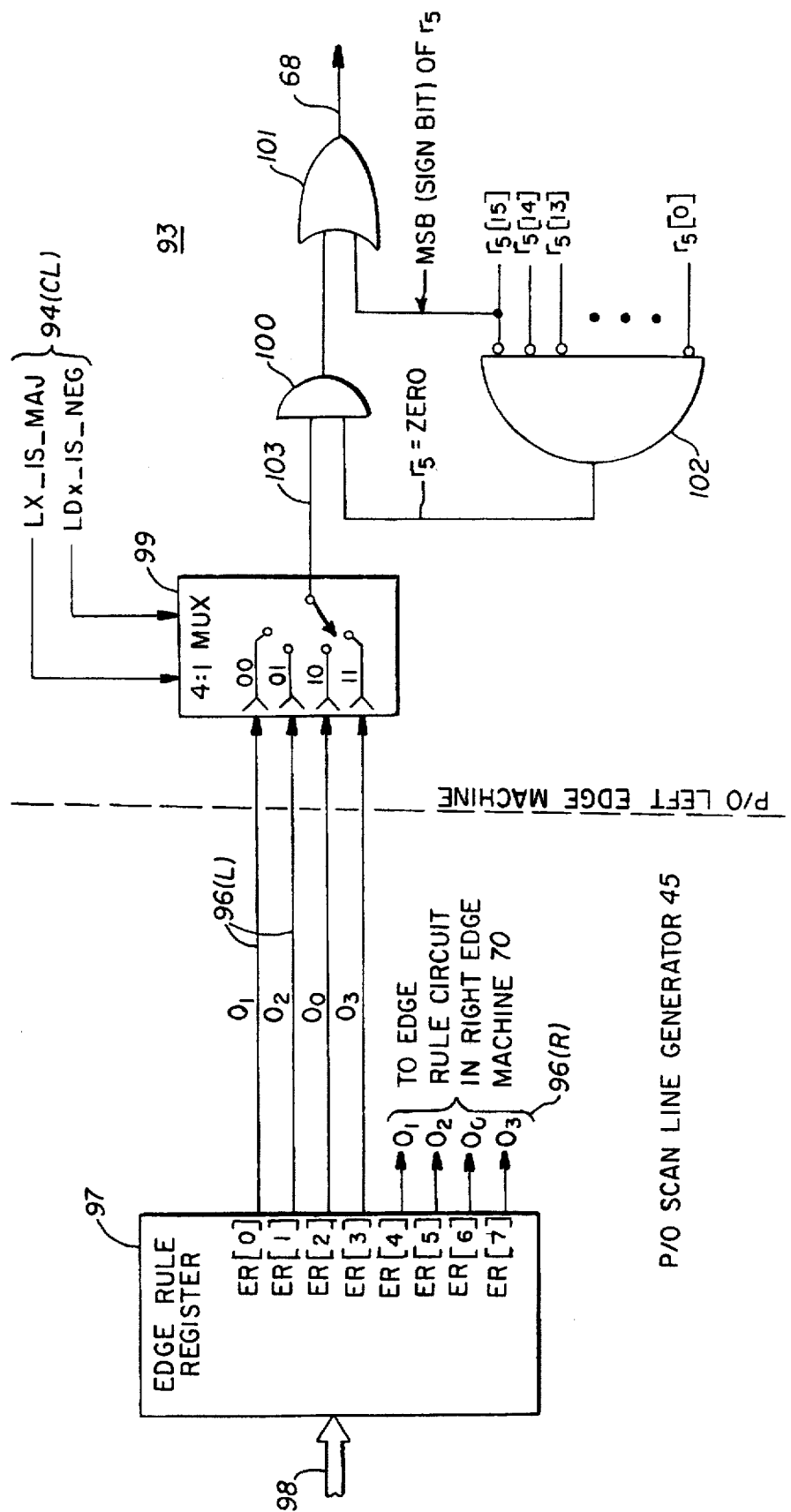
FIG. 5 is a block diagram of a programmable edge role circuit that is incorporated into the edge machine of FIG. 4.

We turn now to the programmable edge rule circuit 93 illustrated in FIG. 5. The purpose of the edge rule circuit 93 is to correctly enforce the edge selection rules for X11 (or whatever other standard might arise). The need for the circuit arises in cases when the error term $d_i$ is zero, which means that the ideal representation of the left (or right) edge passes exactly through a pixel location. In those cases it is necessary to find the correct transition from the present pixel location to the one whose location is exactly on the edge. The edge rule circuit 93 makes this determination for the left edge machine 43. A generally identical edge rule circuit (not shown) makes a corresponding determination for the right edge machine 70.

To begin with, located within the environment of the fill machine/scan line generator 45 is an eight-bit edge rule register 97 whose contents are set by loading a value from a bus 98. Four of the eight bits of edge rule register 97 pertain to the left edge machine 43 and are sent there, while the other four pertain to the right edge machine 70 and are sent there. The four that pertain to the left edge machine are ER[0], ER[1], ER[2] and ER[3], and they represent octants $O_1$, $O_2$, $O_0$ and $O_3$, respectively. For a given set of edge rules the edge rule register 97 is always loaded the same way, and that loading need only be done once, before operation commences. We say that edge rule circuit 93 is programmable because register 97 could be loaded with different contents that implement a different set of edge rules, if desired.

Figure 6:
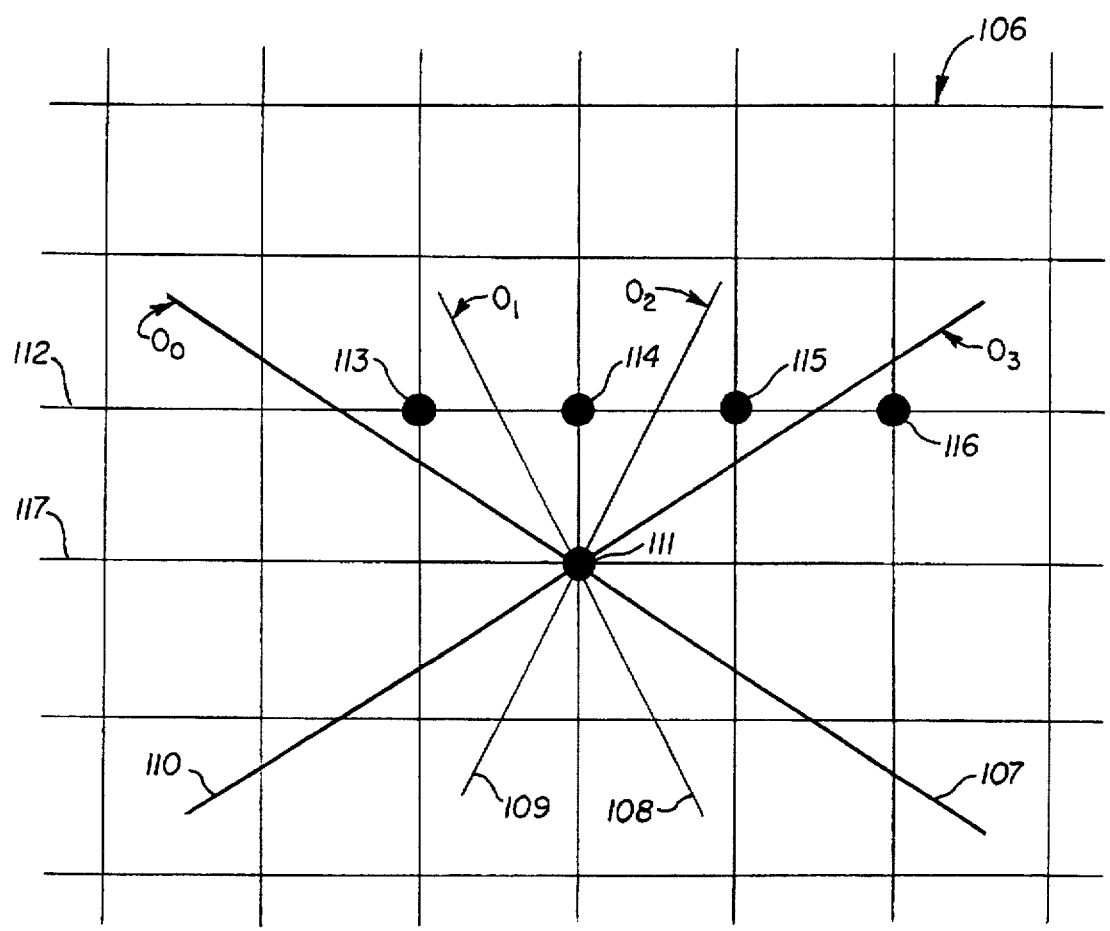
FIG. 6 is a diagram of certain left edge portions that are useful in appreciating the operation of the programmable edge role circuit of FIG. 5.

The example situations depicted in FIG. 6 will aid in understanding why the contents of the edge rule register 97 are selected as they are. First, appreciate that whatever next pixel location is selected along the left edge will be construed as the correct one; and Second, leaving a Scan line implies that a selection has been made.

FIG. 6 depicts a portion of a pixel grid 106 upon which is shown four left edge segments 107, 108, 109 and 110 that lie in $O_0$, $O_1$, $O_2$ and $O_3$, respectively. For this example, all four left edge portions 107–110 pass exactly through pixel location 111. (This is an economy for the sake of the figure. There is no need for all four to pass through the same pixel location; in principle, all that is needed is for each to pass exactly through its own respective separate pixel location.)

Consider the left edge portion 107 in $O_0$ as it crosses scan line 112, which is the one prior to the scan line 117 that contains the pixel location 111. Without any question the result of pixel selection while on scan line 112 is pixel location 113: the $d_i$ associated with pixel location 113 was clearly not zero (the ideal line segment describing the edge does not pass exactly through an intersection of pixel coordinates on scan line 112 of the pixel grid) and pixel location 113 is the one that is to the right of where edge portion 107 intersects scan line 112.

At the time the left edge machine selects pixel 113 by having its address as data 66 and 67 presented for use by the scan line generator 45, register $r_5$ ($d_i$) will equal zero. It will be recalled that the Bresenham error term always pertains to how to get to the next pixel location from the one just found (113). In our present circumstances we have to pick which of a JUMP or a STEP to do. The significance of the choice is not trivial, as they each transition to different locations, alter in different way the residual arithmetic outcomes in the registers within the edge machine, which in turn affects future outcomes further along the edge. Keep in mind that we do not "know" that pixel location 111 is where we are supposed to go. We do know the octant and that the next pixel location is exactly coincident with the edge.

In the case of edge portion 107 it is clear that the correct way to proceed from location 113 is to JUMP (with X as major axis, which is to say, increment both major and minor axis locations). The only other choice is to STEP in X as the major axis, and that clearly is wrong. It is wrong not just because of the particular slope chosen for edge portion 107 as seen in the figure. Rather, it is because the next value of $d_i$ is zero, which means that the next pixel location can't still be on scan line 112, since it is exactly on scan line 117. (Lurking deep in the back of this argument is the idea that $d_i$ wasn't zero for pixel 113, and that edge segment 107 does not have a slope of zero. Keep in mind that it is by leaving scan line 112 that pixel 113 is produced. Scan line 112 could not be left at pixel 113 if the slope of edge portion 107 were indeed zero . . . ) Hence, we need a JUMP indication in the bit ER[2] of the edge rule register 97, since that describes correct action for $d_i$=0 while in $O_0$.

Now consider the left edge segment 108 that lies in $O_1$. While on scan line 112 pixel location 114 is selected, and a $d_i$ of zero is produced. The question is how to transition from pixel location 114. That pixel location 114 has been selected by the left edge machine means that pixel location 115 is of no interest, for if it were, it would stand in place of pixel location 114; the edge machines run until it is time to change the scan line. Also, since the edge portion 108 is in $O_1$, Y is the major axis. This all combines to mean that what is needed is a STEP along the Y is major axis, which is accompanied by no change in the X as minor axis. That would transition us directly from pixel location 114 to pixel location 111. We most certainly do not want a JUMP with Y as the major axis, as that would transition to pixel location 115 (which we just said was the wrong place to go). Hence, we need a STEP indication in the edge register bit ER[0] to describe correct action for $d_i=0$ while in $O_1$.

Now consider the left edge segment 109 that lies in $O_2$. While on scan line 112 pixel location 115 is selected, and a $d_i$ of zero is produced. The question is how to transition from pixel location 115, while using Y as the major axis. Clearly Y changes, because we left scan line 112. Now, since edge portion 109 is in $O_2$ it cannot be completely vertical; exactly vertical would be part of $O_1$. Therefore, no two consecutive values of $d_i$ will be zero while in $O_2$. Thus, if the next value of $d_i$ is zero, then the previous value was not. This means that pixel location 115 is to the right of pixel location 111, owing to Dx<0 and the "to the right of" property of the edge rules. Since pixel locations are discrete, it must be the case that pixel location 111 is exactly one position in X to the left of pixel location 115. Therefore, the desired transition must be a JUMP. (That the edge portion lies in $O_2$ means that the edge machine fixes things so that the change in X is in the proper direction, which in this case is to the left.) Hence, we need a JUMP indication in the edge register bit ER[1] to describe correct action for $d_i=0$ while in $O_2$.

Similar reasoning obtains for the remaining octant $O_3$. For X11 style edge rules, Table 4 below shows the values to be loaded into the Edge Rule Register 97. For different edge rules, Edge. Rule Register 97 would be loaded differently.

TABLE 4

| BIT | OCTANT | VALUE |
|---|---|---|
| ER[0] | $O_1$ | 1 (STEP) |
| ER[1] | $O_2$ | 0 (JUMP) |
| ER[2] | $O_0$ | 0 (JUMP) |
| ER[3] | $O_3$ | 1 (STEP) |
| ER[4] | $O_1$ | 1 (STEP) |
| ER[5] | $O_2$ | 0 (JUMP) |
| ER[6] | $O_0$ | 0 (JUMP) |
| ER[7] | $O_3$ | 1 (STEP) |

To return to FIG. 5, here is how the left edge rule circuit 93 works. Recall that unless the selected pixel is exactly on the left edge the sign bit of $d_i$ is used to correctly select the next pixel along the edge, which selection is already in accordance with the edge rules, since the stepping algorithm associated with FIG. 2 was specifically developed for that purpose. The condition of the left edge passing exactly through a pixel location occurs if and only if the value of $d_i$ (which for the left edge is in $r_5$) is equal to zero. Accordingly, if the value in $r_5$ is not equal to zero we can simply use the sign bit of $r_5$ (i.e., its MSB, denoted by $R_5[15]$) as usual. Observe that the output of AND gate 102 will be false whenever $r_5$ has a non-zero value as its content. That false output forces the output of AND gate 100 to then be false. That in turn leaves $r_5[15]$ as the only variable input to OR gate 101. Thus, the output 68 from OR gate 101 is simply the sign of $d_i$.

Now consider the case when the value of $d_i$ is exactly zero. This case corresponds to neither Eq. (11) nor Eq. (12), and represents a case where whether to STEP (an increment in the major axis without an increment in the minor axis) or JUMP (an increment in both axes) must be further determined in accordance with the edge rules. The sign bit of $r_5$ is false, by assumption, so we can use the output of AND gate 100 to determine the output 68 of OR gate 101. AND gate 100 has only two inputs, and the one from the output of AND gate 102 is true, by assumption, so the other input 103 to AND gate 100 now determines output 68. Signal 103 is the output of MUX 99, whose job it is to select one of the bits in the edge rule register 97 as its output (103), based on what octant contains the left edge (indicated by signals 94(L)). So, whether output signal 68 causes a STEP or a JUMP along the left edge will be determined by the octant information 94(L). That is, for each of the four combinations of the signals LX_IS_MAJ (left edge is X major: $O_0$ or $O_3$) and LDx$_{13}$ IS$_{13}$ NEG (left edge slants to the left: $O_2$ or $O_3$), we put into the corresponding bit of the four hits ER[0] through ER[3] what the value of signal 68 should be. A one causes a STEP and a zero causes a JUMP.

It will be appreciated that the edge rule circuit 93, in conjunction with edge role register 97, provide a way to dynamically modify the rules "If $d_i<0$ then choose $STEP_i$. . . " associated with Eq. (11) and "Else $d_i>0$ and we choose $JUMP_i$. . . " associated with Eq.(12). The modification is for exactly one or the other of those rules to include the condition of equality: "If $d_i \leq 0$ then choose $STEP_i$, . . . " or "Else $d_i \geq 0$ and we choose $JUMP_i$, . . . ". Which of the two rules gets the additional condition of equality included depends upon the octant, in accordance with the edge rules in effect. For X11 edge rules $O_0$ and $O_2$ produce "Else $d_i \leq 0$ and we choose $JUMP_i$. . . " and $O_1$ and $O_3$ produce "If $d_i \leq 0$ then choose $STEP_i$, . . . ".

It will be appreciated that there is also a right edge rule circuit, which, although not shown, is identical in structure to the left edge rule circuit 93, and is driven by ER[4]–ER[7] (96(R)). The only difference is that the signals 94(L) LX_IS_MAJ and LDx_IS_NEG are replaced in the right edge rule circuit by signals 94(R) RX_IS_MAJ and RDx_IS_NEG (which are not shown). The edge rule circuit for the right edge machine works exactly the same way as for the left edge machine. This ensures that correct scan fine lengths are obtained when the left location is subtracted from the right pixel location.

Figure 7:
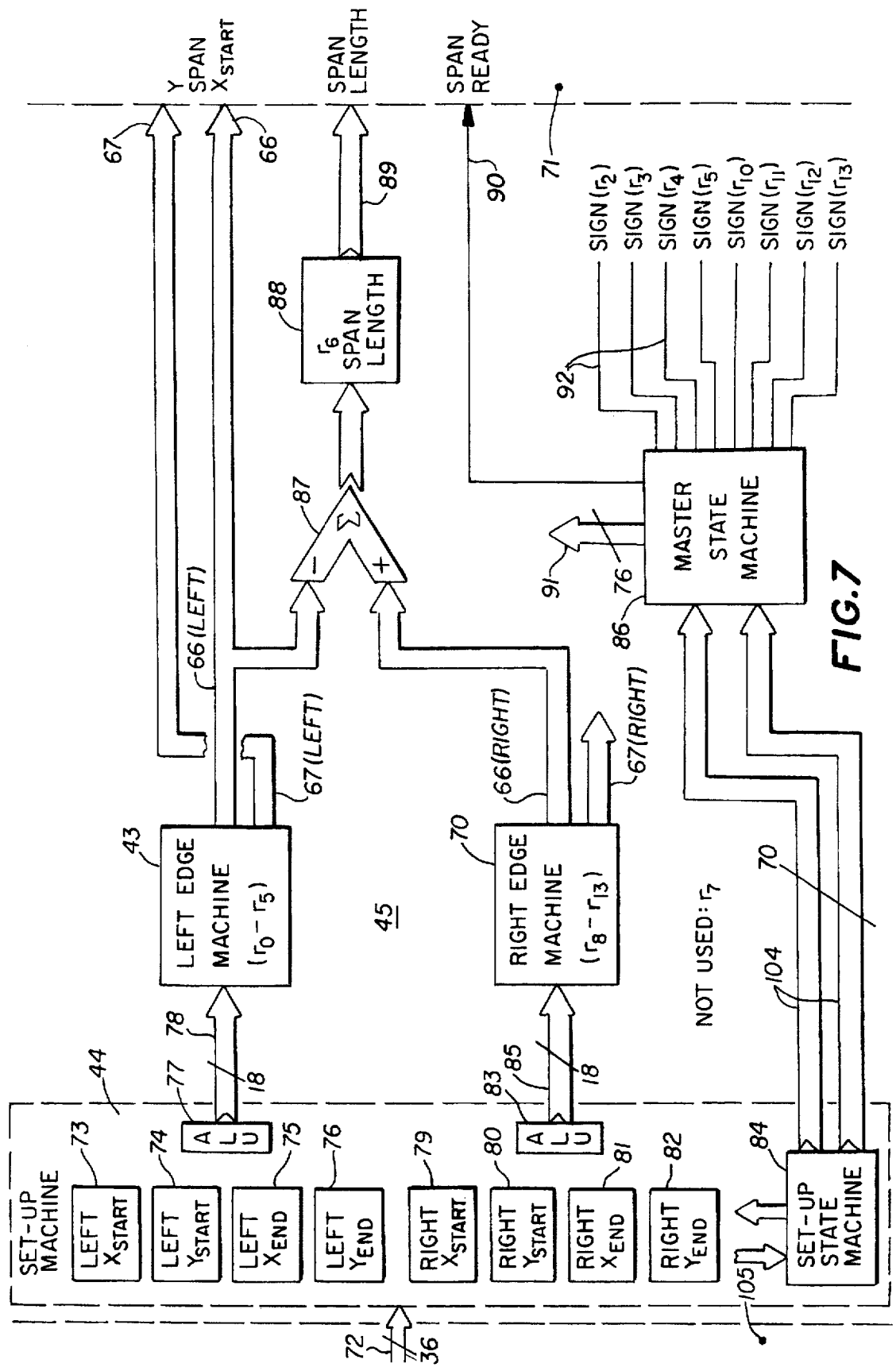
FIG. 7 is a simplified block diagram of a polygon fill machine that identifies proper edge and interior pixel locations of extensible polygons using a pair of edge machines such as that depicted in FIG. 4.

Refer now to FIG. 7, wherein is depicted a condensed block diagram of a scan fine generator 45 that performs area fill of extensible polygons. It includes two edge machines of the sort described above. In particular, it has a left edge machine 43 and a right edge machine 70. The left edge machine continues to have the familiar $r_0$–$r_5$ already described, while the right edge machine 70 has corresponding registers $r_8$–$r_{13}$. (Register $r_6$ 88 is part of the larger environment of scan line generator 45, and there is no $r_7$.) These edge machines work on edges whose end points were described to a set-up machine 44. The set-up machine 44 receives data and control information from a preceding environment 105 via bus 72. From bus 72 edge end-point dam is loaded into associated registers 73–76 and 79–82. Respective ALU's 77 and 83 perform, under the control of a set-up state machine 84, the computations needed to get the two edge machines working on their respective edges: ALU 77 communicates data to the left edge machine 43 over bus 78, while ALU 83 communicates with the right edge machine 70 over bus 85.

As far as the outputs are concerned, the left edge machine 43 produces a scan line identifier Y 67, a SPAN $X_{start}$ 66 and a SPAN LENGTH 89 that is the difference between the left and right $X_{start}$ values 66 from the two edge machines. The difference is of the form right minus left, and is found by adder 87, and is stored in register $r_6$ SPAN LENGTH 88. An output SPAN READY 90 is also supplied, and indicates to a using environment 71 that the other outputs 66, 67 and 89 are valid.

A master state machine 86 controls the overall operation of the scan line generator 45 and its constituent elements. To do this it responds to various sign information 92 as indicated. It produces 76 lines of instruction and other control information 91 for the two edge machines and their downstream circuits. Some seventy lines of control information 104 are used to interact with the set-up state machine 84. The master state machine 86 also produces the signal SPAN READY 90.

Figure 8A:
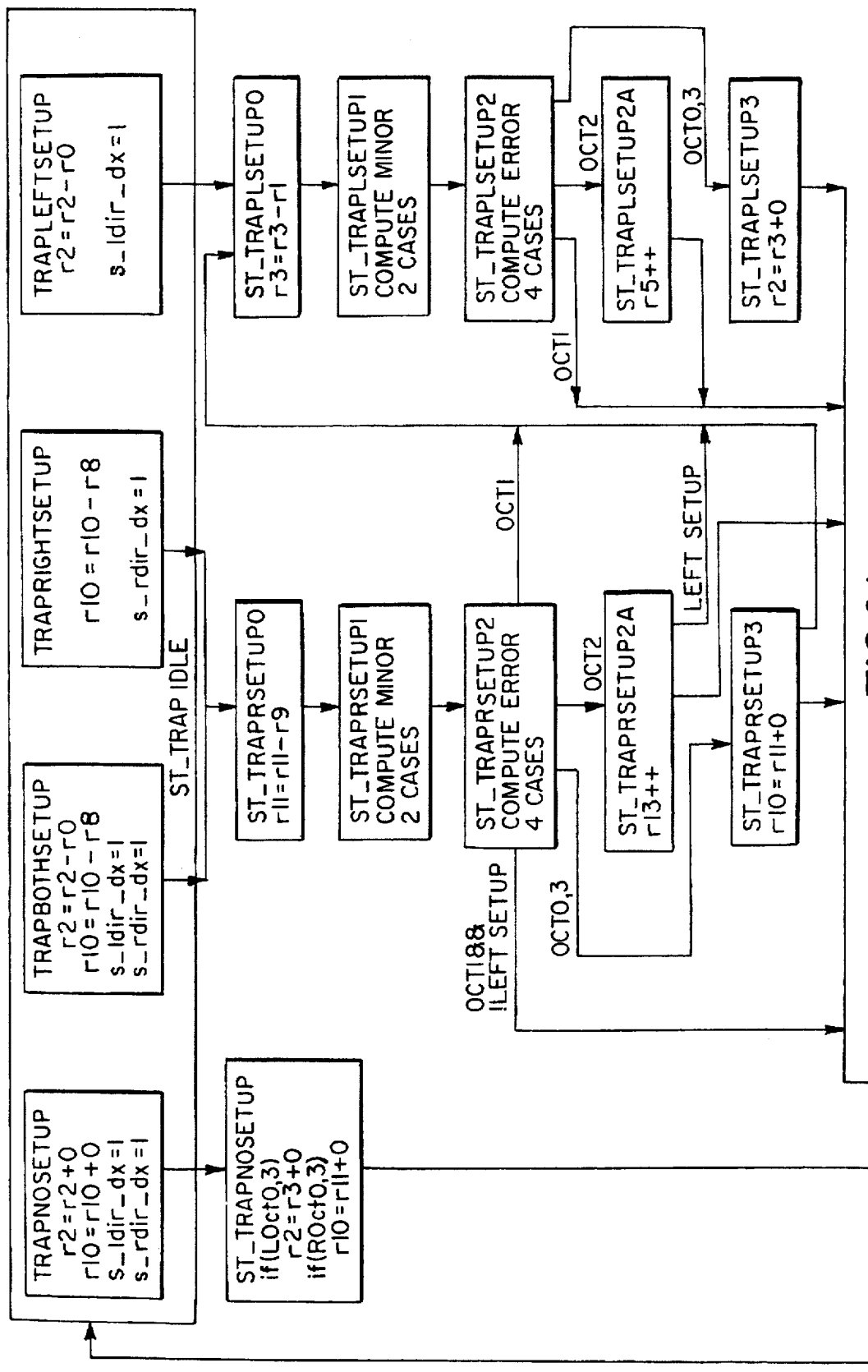
FIG. 8 is a flow diagram indicating the possible operational sequences experienced by the polygon fill machine of FIG. 7 as various different extensible polygons are processed.
Figure 8B:
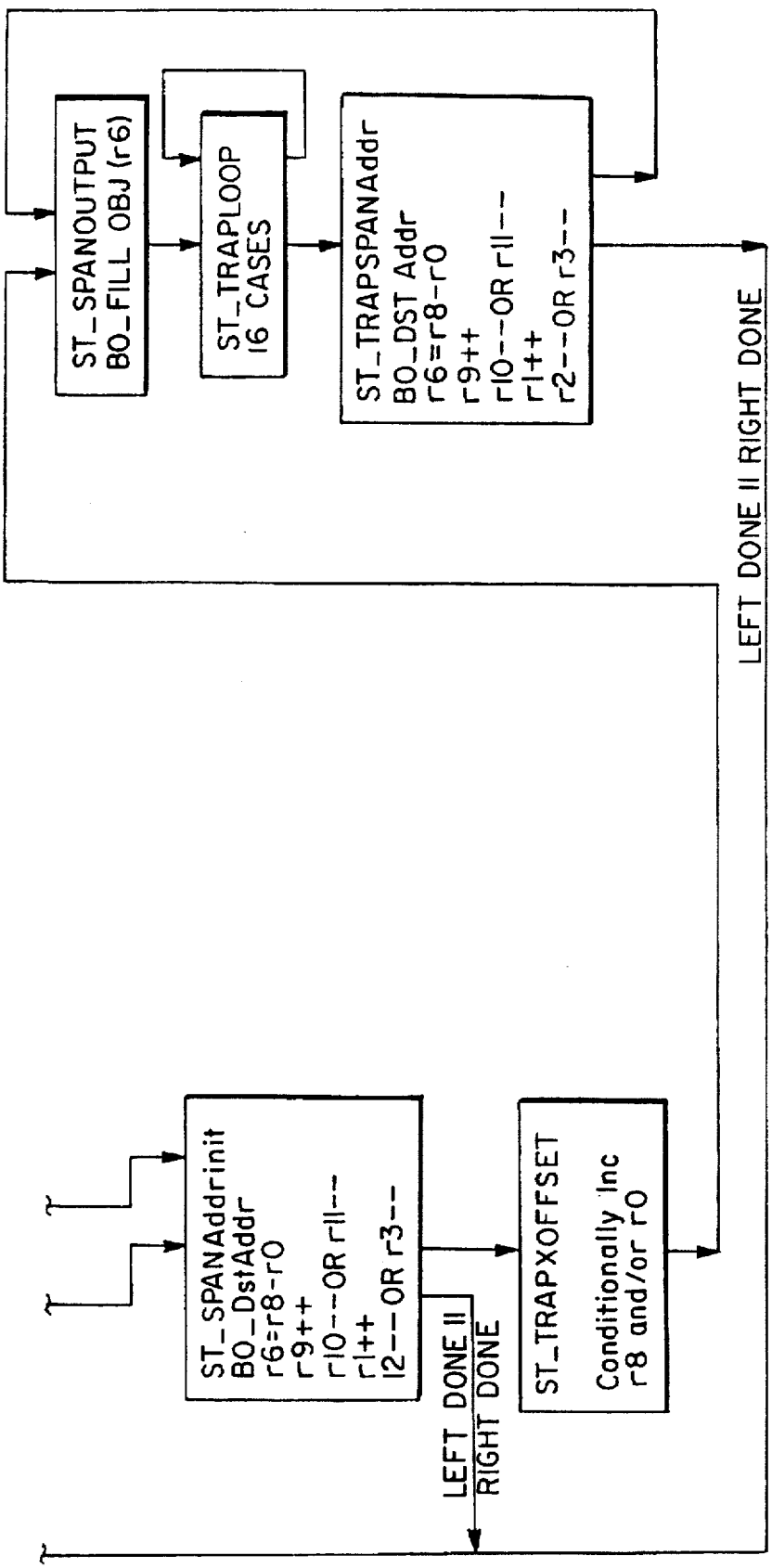

The fundamental rule for controlling two edge machines is that both may run simultaneously, but which ever one is first to find its next pixel has to stop and wait for the other one to catch up. The exact relationships that exist are set out in Appendix A. FIG. 8 is a simplified overview flow chart of the processes shown in detail in Appendix A. FIG. 8 is readily appreciable by those who have understood the description to this point. There are, however, some minor differences that need to be addressed. FIG. 8 and Appendix A originated in an engineering environment using different terminology and some special conventions. It is impractical to recast the Appendix to eliminate these; accordingly, FIG. 8 and the Appendix are left pretty much as they were originally made, and instead we provide bridge to allow their successful interpretation on their own terms.

We begin with a number of notational conventions and terms. Certain original documentation associated with the design of the scan line generator talked of trapezoids, rather than of polygons. It was felt that "trapezoids", while not altogether incorrect, was somewhat restrictive. "Trapezoids" was replaced in favor of "polygons" in the Specification, but remains in FIG. 8 and in the Appendix. The term "Trap" is used in various labels and variable names, and represents "trapezoid". Next, there are numerous labels that start out "ST_Trap . . . " The "ST" stands for the term "STATE", as for a name of a state in a state machine. Each such instance of "ST_Trap . . . " has a corresponding procedure of the same name in the Appendix. That corresponding procedure defines the associated state in the state machine. Register names for $r_0, r_1, r_2, \ldots$ remain the same, although it will be noted that they are not subscripted, and it will be recalled that there is no $r_7$. Finally, r1++ means increment $r_1$, r2-- means decrement $r_2$, the two vertical bars || mean "or" (logical disjunction), two ampersands && mean "and" (logical conjunction), and ! XXX denotes the complement of XXX.

As for the content of the flowchart itself (in FIG. 8), the top two thirds is set-up activity. The bottom right-hand corner corresponds to the edge machines traversing along their respective edges. The flow chart should be seen as an overall description of a large scale process; rather than as a detailed description. There are after all, multiple state machines running in parallel, while a flow chart assumes that it can be traversed with just one finger pointing to only one box at any given time. The flowchart of FIG. 8 should be seen principally as a guide to Appendix A.

There follow now thirty pages of program listing in C that comprise Appendix A. This code was originally written as a development and debugging simulator to operate in place of a hardware state machine. With only minor (essentially cosmetic) changes it served as the basis for the input text to a state machine generator (Verilog). The machine embodied by the code takes care of set-up and sixteen basic conditions. The sixteen conditions are the combination of the left edge machine dealing an edge in any of the four octants $O_0$ through $O_3$ while at the same the right edge machine deals with an edge in any of the four octants $O_0$ through $O_3$.

I claim:

1. A method of describing pixel locations that represent a polygon edge as a sequence of STEPs and JUMPs upon a pixel grid whose pixel locations therein are indicated by integer Cartesian coordinates (X, Y), a STEP being a one pixel location change along a major axis accompanied by no change in the pixel location along a minor axis and a JUMP being a one pixel location change along the major axis that is accompanied by a one pixel location change along the minor axis, the polygon edge having X as a major axis and Y as a minor axis and the polygon to be displayed by illuminating selected pixels belonging to the pixel grid, the method comprising the steps of:

(a) determining from an $(X_{start}, Y_{start})$ and from an $(X_{end}, Y_{end})$ describing a polygon edge a $dx=X_{end}-X_{start}$ and a $dy=Y_{end}-Y_{start}$;

(b) initially assigning to an iteration variable $d_i$ the value dy−dx, where i is an integer indicating the ordinal number of the iteration to be performed next and the initial value of i is one;

(c) if $d_i<0$ indicating a STEP and assigning $d_{i+1}$ the value $d_i+dy$;

(d) if $d_i>0$ indicating a JUMP and assigning $d_{i+1}$ the value $d_i+dy-dx$;

(e) if $d_i=0$ performing either step (c) or step (d) in accordance with the slope of the polygon edge;

(f) repeating steps (c) through (e) until the entire polygon edge has been described; and (g) illuminating those pixels in the pixel grid visited by the sequence of STEPs and JUMPs produced by steps (c), (d) and (e), the sequence starting at the pixel location $(X_{start}, Y_{start})$.

2. A method of describing pixel locations that represent a polygon edge as a sequence of STEPs and JUMPs upon a pixel grid whose pixel locations therein are indicated by integer Cartesian coordinates (X, Y), a STEP being a one pixel location change along a major axis accompanied by no change in the pixel location along a minor axis and a JUMP being a one pixel location change along the major axis that is accompanied by a one pixel location change along the minor axis, the polygon edge having X as a minor axis and Y as a major axis and the polygon to be displayed by illuminating selected pixels belonging to the pixel grid, the method comprising the steps of:

(a) determining from an $(X_{start}, Y_{start})$ and from an $(X_{end}, Y_{end})$ describing a polygon edge a $dx=X_{end}-X_{start}$ and a $dy=Y_{end}-Y_{start}$;

(b) initially assigning to an iteration variable $d_i$ the value dx−dy, where i is an integer indicating the ordinal number of the iteration to be performed next and the initial value of i is one;

(c) if $d_i<0$ indicating a STEP and assigning $d_{i+1}$ the value $d_i+dx$;

(d) if $d_i>0$ indicating a JUMP and assigning $d_{i+1}$ the value $d_i+dx-dy$;

(e) if $d_i=0$ performing either step (c) or step (d) in accordance with the slope of the polygon edge;

(f) repeating steps (c) through (e) until the entire polygon edge has been described; and (g) illuminating those pixels in the pixel grid visited by the sequence of STEPs and JUMPs produced by steps (c), (d) and (e), the sequence starting at the pixel location ($X_{start}$, $Y_{start}$).

3. A method as in claim 1 or claim 2 wherein step (e) further comprises the steps of:
(h) if the polygon edge is in an octant $O_0$ indicating a JUMP and assigning $d_{i+1}$ the value $d_i+dy-dx$;
(i) if the polygon edge is in an octant $O_1$ indicating a STEP and assigning $d_{i+1}$ the value $d_i+dx$;
(j) if the polygon edge is in an octant $O_2$ indicating a JUMP and assigning $d_{i+1}$ the value $d_{i-dy+dx}$;
(k) if the polygon edge in an octant $O_3$ indicating a STEP and assigning $d_{i+1}$ the value $d_i+dy$; and
further wherein the octant containing the polygon edge is determined by the angle θ that the polygon edge makes with the X axis, thus:

| | |
|---|---|
| $O_0$ | 0° ≤ θ < 45° |
| $O_1$ | 45° ≤ θ ≤ 90° |
| $O_2$ | 90° < θ ≤ 135° |
| $O_3$ | 135° < θ ≤ 180°. |

4. Apparatus for describing pixel locations that represent a polygon edge as a sequence of STEPs and JUMPs upon a pixel grid whose pixel locations therein are indicated by integer Cartesian coordinates (X, Y), a STEP being a one pixel location change along a major axis accompanied by no change in the pixel location along a minor axis and a JUMP being a one pixel location change along the major axis that is accompanied by a one pixel location change along the minor axis, the polygon to be displayed by illuminating selected pixels belonging to the pixel grid, the apparatus comprising:

first through fourth input registers that respectively receive pixel location coordinates $X_{start}$, $Y_{start}$, $X_{end}$ and $Y_{end}$;

a first circuit, coupled to the first through fourth input registers, that computes $dx=X_{end}-X_{start}$ and $dy=Y_{end}-Y_{start}$;

a second circuit, coupled to the values of dy and dx, that produces a major axis signal indicating, according to whichever of dy and dx has the larger absolute value, which of the X or Y axes is the major axis;

a third circuit, coupled to the values of dy and dx and to the axis signal, that computes an initial value of an iteration variable $d_i$, the initial value being dy−dx if X is the major axis and being dx−dy if Y is the major axis; and a fourth circuit, coupled to the major axis signal and to the values of dy and dx, that indicates STEPs and JUMPs and that computes successive values $d_{i+1}$ of the iteration variable $d_i$ according to the sign of $d_i$ and according to which axis is the major axis:

if X is the major axis and $d_i>0$ then $d_{i+1}=di+dy-dx$ and indicate a JUMP;
if X is the major axis and $d_i<0$ then $d_{i+1}=d_i+dy$ and indicate a STEP;
if Y is the major axis and $d_i>0$ then $d_{i+1}=d_i+dx-dy$ and indicate a JUMP; and
if Y is the major axis and $d_i<0$ then $d_{i+1}=d_i+dx$ and indicate a STEP.

5. Apparatus as in claim 4 further comprising a fifth circuit, coupled to the fourth circuit, that indicates STEPs and JUMPs and that computes the value of $d_{i+1}$ whenever di=0:

if X is the major axis and dx>0 then $d_{i+1}=d_i+dy-dx$ and indicate a JUMP;
if Y is the major axis and dx>0 then $d_{i+1}=d_i+dx$ and indicate a STEP;
if Y is the major axis and dx<0 then $d_{i+1}=d_i-dy+dx$ and indicate a JUMP; and
if X is the major axis and dx<0 then $d_{i+1}\rightarrow d_i+dy$ and indicate a STEP.

6. Apparatus as in claim 4 further comprising a sixth circuit, coupled to the value of dy and to the fourth circuit, that stores that value and decrements the stored value of dy once each time a STEP or a JUMP is indicated, and further wherein the apparatus ceases to indicate STEPs and JUMPs when the decremented value of dy reaches zero.

7. Apparatus as in claim 4 further comprising a pixel location address circuit, coupled to the values of $X_{start}$ and of $Y_{start}$, of dx, to the major axis signal and to the indications of JUMP and STEP, that initially stores the values of $X_{start}$ and of $Y_{start}$ and that subsequently produces adjusted ($X_i$, $Y_i$) pixel location addresses according to the sequence of STEPs and JUMPs produced to describe the polygon edge:

If dx>0, X is the major axis and a STEP is indicated $X_{i+1}=1+X_i$ and $Y_{i+1}=Y_i$;

If dx>0, X is the major axis and a JUMP is indicated $X_{i+1}=1+X_i$ and $Y_{i+1}=1+Y_i$;

If dx>0, Y is the major axis and a STEP is indicated $X_{i+1}=X_i$ and $Y_{i+1}=1+Y_i$;

If dx>0, Y is the major axis and a JUMP is indicated $X_{i+1}=1+X_i$ and $Y_{i+1}=1+Y_i$;

If dx<0, X is the major axis and a STEP is indicated $X_{i+1}=-1+X_i$ and $Y_{i+1}=Y_i$;

If dx<0, X is the major axis and a JUMP is indicated $X_{i+1}=-1+X_i$ and $Y_{i+1}=1+Y_i$; and If dx<0, Y is the major axis and a JUMP is indicated $X_{i+1}=-1+X_i$ and $Y_{i+1}=1+Y_i$.

8. Scan line generation apparatus that determines the number of pixels along a scan line, parallel to the X axis, that are interior to a polygon having a left polygon edge and a right polygon edge, the apparatus having first and second instances of the apparatus of claim 7, the first instance of the apparatus of claim 7 processing the left polygon edge and the second instance of the apparatus of claim 4 processing the right polygon edge, the scan line generation apparatus further comprising a scan line length circuit coupled to the X portion of the adjusted pixel location address of the pixel location address circuit of each instance of the apparatus of claim 7, the scan line length circuit computing the length along a scan line between the left polygon edge and the right polygon edge.

\* \* \* \* \*

UNITED STATES PATENT AND TRADEMARK OFFICE
CERTIFICATE OF CORRECTION

PATENT NO. : 5,673,379         Page 1 of 3
DATED     : September 30, 1997
INVENTOR(S) : Michael R. Diehl It is certified that error appears in the above-indentified patent and that said Letters Patent is hereby corrected as shown below:

Column 2, Line 45:    "role" should be --rule--

Column 2, Line 49:    "role" should be --rule--

Column 3, Line 48:    "heeded" should be --needed--

Column 5, Line 9:    after "octants" insert --,--

Column 5, Line 26:    "as" should be --rather,--

Column 6, Line 50:    after "pixel" delete "."

Column 7, Line 1:    "$d_{i+1}-d_i=dy(x_{i-1}+1)-dy(x_{i-1}+1)-dx(y_i+1)+dx(y_{i-1}+1)$" should be --$d_{i+1}-d_i=dy(x_i+1)-dy(x_{i-1}+1)-dx(y_i+1)+dx(y_{i-1}+1)$--

Column 7, Line 13:    "$d_1=dy(x_{i-1}+1)-dx(y_{i-1}+1)$" should be --$d_1=dy(x_{1-1}z+1)-dx(y_{1-1}+1)$--

Column 7, Line 17:    "$d_1<0$" should be --$d_i<0$--

Column 7, Line 48:    "$C_{l1}$" should be --$C_{L1}$--

Column 8, Line 1:    "$C_{R3}$,and" should be --$C_{R3}$, and--

Column 9, Line 20:    "a-previous" should be --a previous--

UNITED STATES PATENT AND TRADEMARK OFFICE
CERTIFICATE OF CORRECTION

PATENT NO. : 5,673,379
DATED : September 30, 1997
INVENTOR(S) : Michael R. Diehl It is certified that error appears in the above-indentified patent and that said Letters Patent is hereby corrected as shown below:

Column 10, Line 10: after "$d_i$" delete ";"

Column 10, Line 59: "he" should be --the--

Column 11, Line 44: "cede" should be --code--

Column 12, Line 17: "Scan" should be --scan--

Column 13, Line 38: after "Edge" delete "."

Column 14, Line 18: "$LDx_{13}IS_{13}NEG$" should be --LDx_IS_NEG--

Column 14, Line 19: "hits" should be --bits--

Column 14, Line 23: "role" should be --rule--

Column 14, Line 32: "$d_i \leq 0$" should be --$d_i \geq 0$--

Column 14, Line 43: "fine" should be --line--

Column 14, Line 47: "fine" should be --line--

Column 14, Line 59: "dam" should be --data--

UNITED STATES PATENT AND TRADEMARK OFFICE
CERTIFICATE OF CORRECTION

PATENT NO. : 5,673,379
DATED : September 30, 1997
INVENTOR(S) : Michael R. Diehl It is certified that error appears in the above-indentified patent and that said Letters Patent is hereby corrected as shown below:

Column 14, Line 62: "edges:" should be --edges.--

Column 15, Line 11: "76" should be --seventy-six--

Column 15, Line 18: "which ever" should be --whichever--

Column 15, Line 51: "! XXX" should be --!XXX--

In the Claims

Column 16, Line 22: "$dy=Y_{end}=Y_{start}$" should be --$dy=Y_{end}-Y_{start}$--

Column 17, Line 12: "$d_{i\text{-}dy+dx;}$" should be --$d_i\text{-}dy+dx;$--

Column 18, Line 14: "$d_{i+1} \rightarrow d_i+dy$" should be --$d_{i+1}=d_i+dy$--

Column 18, Line 52: "4" should be --7--

Signed and Sealed this

Thirteenth Day of March, 2001

Attest:

NICHOLAS P. GODICI

Attesting Officer            Acting Director of the United States Patent and Trademark Office